March 24, 1953  A. WILL  2,632,256
AXLE ALIGNING DEVICE
Filed June 3, 1950
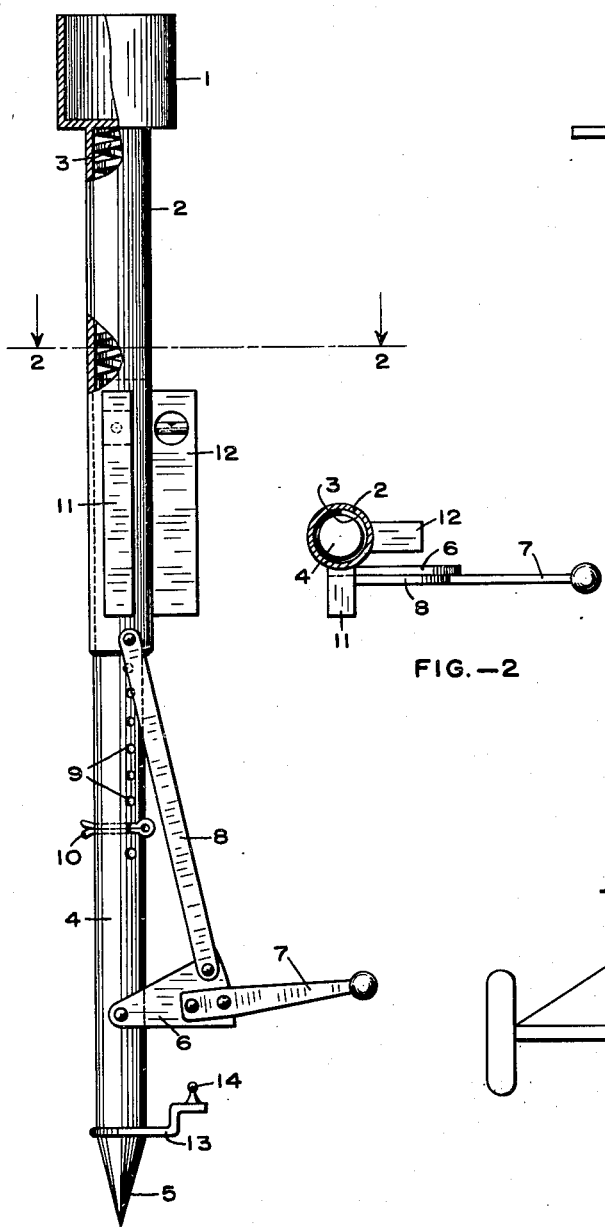
FIG.—1
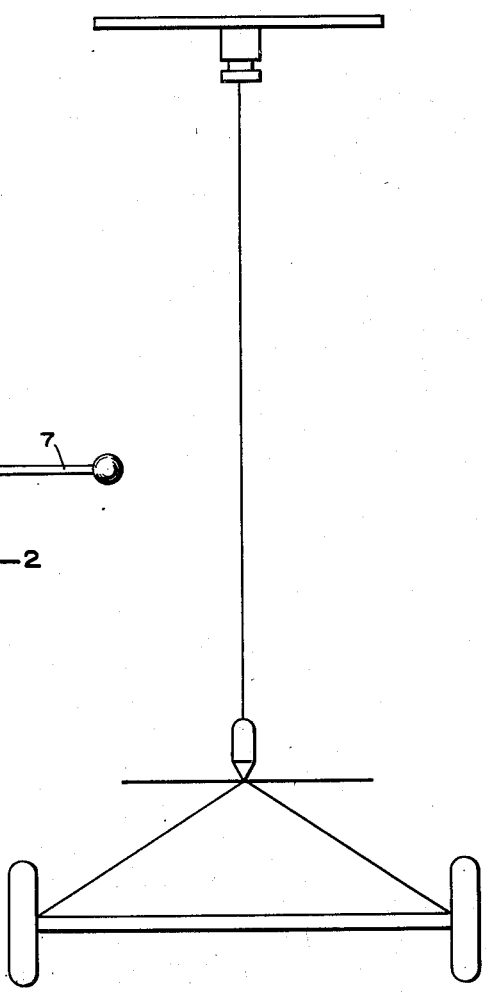
FIG.—2
FIG.—3
*INVENTOR.*
Alex Will
BY
*Lamphere and Van Valkenburgh*
ATTORNEYS Patented Mar. 24, 1953

2,632,256

UNITED STATES PATENT OFFICE 2,632,256

AXLE ALIGNING DEVICE

Alex Will, Denver, Colo.

Continuation of application Serial No. 698,810, September 23, 1946. This application June 3, 1950, Serial No. 165,907

4 Claims. (Cl. 33—193)

This application is a continuation of my copending application Serial No. 698,810 filed September 23, 1946, now abandoned, for Axle Alining Device.

My invention relates to improvements in devices for alining the axle of a trailer having a king pin by which the trailer is mounted on a truck or tractor unit.

The purpose of this invention is to provide a unitary member or staff adapted to be placed under a trailer in association with a king pin to thereby provide means whereby the trailer axles can be properly alined. The unitary member or staff is to replace the usual plumb bob used in alining the rear axle from the king pin. The staff, as disclosed, is so constructed that it can be contracted so as to be easily associated with a king pin and held contracted until it is adjusted to the vertical position by angularly positioned spirit levels on the sides thereof. After being adjusted, the length of the staff is extended and positively held in a true position between the king pin and ground while measurements are taken therefrom to points on the rear axle of the trailer.

It is found advisable, from an economical standpoint, to aline the axle of a trailer with reference to the king pin, as axles out of alinement cause excessive and destructive wear on the trailer tires in a short time. Also, when trailer axles are properly alined, the trailer pulls more easily, thus requiring less motive power, and also the tractor-trailer combination is operated with less effort. Heretofore, to aline an axle, the services of two persons have been required since the alining process used necessitated one man to hold the plumb bob and one end of a tape at the king pin and the other man to hold the other end of the tape at the axle.

One of the objects of this invention is to provide a device by means of which the axle of a trailer can be quickly and easily alined by one person.

A further object is the provision of an alining device for trailers which can be easily associated with a king pin and positively held in a vertical position so that accurate measurement can be accomplished by a tape, usable by a single person.

A still further object is to produce a device for positioning between a king pin of a trailer and the support surface on which the trailer sets, which will be usable with any king pins regardless of height from the support surface or the particular type involved.

Another object is to construct an improved staff structure for use in alining trailer axles and to mount thereon means whereby the staff can be conveniently used with a tape to measure distances to accomplish the alining.

These and other objects are obtained by the novel construction and arrangement of parts hereinafter described and illustrated by the accompanying drawings, forming a part hereof, and in which:

Figure 1 is an elevational view of a device embodying the invention;

Figure 2 is a sectional view taken on the line 2—2 of Figure 1; and

Figure 3 is a view showing the old method of alining axles with a plumb bob, which will be discarded when my improved device is employed.

In accordance with my invention embodied in the structure disclosed in Figures 1 and 2, there is provided a staff having a cup 1 which is adapted to fit over a king pin. Connected to this cup is a tube 2 in which is positioned a coiled spring 3, bearing against a rod 4 which is telescopically received in the tube 2. The lower end 5 of the rod 4 is pointed, as shown, so as to obtain a non-slipping engagement with the ground or other surface. Above the pointed end is a lever 6 having a handle 7, said lever being connected by a link 8 to the lower end of tube 2. By means of the lever and link the tube and rod may be easily drawn together so that the cup 1 can be placed under the lower end of a king pin of a trailer. When the lever is released the spring urges the cup over the king pin and projects the rod downwardly and causes the pointed lower end to be engaged with pressure against the ground or other support beneath the king pin. The rod 4 has a plurality of holes 9 adapted to receive a cotter pin 10. This cotter pin acts as an adjustable stop for predetermining the length of the contracted condition of the staff during the placing of the device under a king pin of a trailer.

On the tube 2 are mounted two levels 11 and 12 at right angles to each other which enables the staff to be accurately placed in a vertical position between the king pin and ground or support. A ring 13 is rotatably mounted on the lower end of the rod 4 just above pointed end 5 and this ring has an upstanding pin 14 over which the loop end on a tape can be placed.

It will be seen that the device can be quickly attached to the king pin of a trailer and adjusted so that it is vertical. This vertical position will be positively maintained by the action of the spring 3. One end of a tape is next attached to the hook 14 and the operator will be free to hold the other end of the tape at the axle. With the ring being rotatable, it is not necessary for the operator to go to the staff in making his different measurements. Only one operator is required. The device is simple, and can be quickly set up and accurate measurements made in a short period of time.

The structure of the particular device just described is to be considered as illustrative only of the invention. Modifications can be made without departing from the intended scope of the invention. Other types of levels can be employed, as well as means for causing the staff to cooperate properly with the king pin. With these and other modifications possible, it is to be understood that the invention is to be limited only in accordance with the terms of the appended claims and equivalents.

What is claimed is:

1. A device for alining an axle of a vehicle, comprising a telescoping staff having a cup to fit over a king pin, a tube connected to the cup, a compression spring in the tube, a rod having a pointed lower end and being telescoped in the tube for bearing against the compression spring, a pair of levels on the tube arranged at right angles to each other for determining the positioning of the staff vertically, a hook means rotatably mounted on the lower end of the staff, a lever pivoted on the lower end of the staff, and a link connecting the lever and tube to draw the rod into the tube.

2. A wheel and axle alining device for trailers having a king pin and an axle, comprising a telescoping staff having a king pin receiving cup on the upper end and a point on the lower end, a pair of spirit levels carried by the staff for determining vertical positioning thereof, one of said levels being positioned at an angle of 90 degrees to the other, resilient means in the staff for urging the ends apart, and a hand lever for drawing the ends of the staff together against the resilient means.

3. A wheel and axle alining device for trailers having a king pin and an axle, comprising a telescoping staff having a king pin receiving cup on the upper end and a point on the lower end, a pair of spirit levels for vertical alinement carried by the staff, one of said levels positioned at an angle of 90 degrees to the other, resilient means in the staff for urging the ends apart, a hand lever for drawing the ends of the staff together against the resilient means, and adjusting means for determining the length of the staff when in the contracted position.

4. An alining device for interpositioning between a vehicle king pin and the vehicle supporting surface to thereby aid with the use of a tape the alining of an axle spaced from the king pin, said device comprising a structure having two overlapping longitudinal members with means on the free end of one member for non-slippage engagement with the vehicle support surface and means on the free end of the other member for firm engagement with the king pin, means for adjustably securing said members together so the length of the structure can be varied by relative longitudinal sliding movement therebetween, a coil spring carried by one of the overlapping members and acting on the other for permitting the structure by compression of the spring to be shortened in length after the members are in secured together relation and also acting to cause the ends of the structure to have pressure engagement with the king pin and the support surface when the structure is in interposed operative position therebetween, said spring providing the sole means for maintaining the longitudinal axis of the device vertical, level means mounted on the structure for determining a vertical position of the structure, and means carried by the structure for connecting the free end of a tape thereto and being mounted to be readily movable about the axis of the structure so the line of the tape will always pass through said axis as the tape is employed to extend from the device to the opposite ends of the axle.

ALEX WILL.

REFERENCES CITED

The following references are of record in the file of this patent:

UNITED STATES PATENTS

| Number | Name | Date |
|---|---|---|
| 301,869 | Dickinson | July 15, 1884 |
| 2,028,836 | Holgate | Jan. 28, 1936 |
| 2,096,638 | Higgins | Oct. 19, 1937 |
| 2,479,723 | Brown | Aug. 23, 1949 |

FOREIGN PATENTS

| Number | Country | Date |
|---|---|---|
| 133,345 | Germany | Aug. 11, 1902 |